United States Patent Office 3,145,438
Patented Aug. 25, 1964

3,145,438
GAS CURE OF ORGANIC BONDS FOR SAND AND ABRASIVE GRANULES
Roger H. Kottke and James J. Engel, Minneapolis, Minn., assignors to Archer-Daniels-Midland Company, Minneapolis, Minn., a corporation of Delaware
No Drawing. Filed Sept. 18, 1958, Ser. No. 761,677
5 Claims. (Cl. 22—193)

This invention relates to gas cured organic binders for sand and granular materials and to an improvement in the method and application of organic binders preferably for bonding mold and core sand and less preferably granular abrasive materials. More particularly this improvement concerns the process of obtaining hard set bonds in the absence of heat with selective organic binders for mold and core sand materials and for abrasive granules as in sandpapers and abrasive wheels in a matter of from a few seconds to a few minutes. That is, in the preferred method and application, the improvement concerns a process of utilizing selective organic binders which are mixed with mold and core sand material, to permit free flow and handling thereof over long periods of time and provides for a quick curing at normal room temperatures by a selective resin forming strong acid gas treatment, for binding the sand particles into a solid and rigid mass as needs be provided in bonding mold and core sand bodies.

At the present time, the curing of inorganic silicate binders with carbon dioxide gas is known. However, mold and core sand mixtures containing silicate binders have limited bench life and lack tensile strength. Otherwise, the conventional method of setting or curing core sand mixtures which are prepared with an organic liquid binder is to bake the formed core in an oven at perhaps 300° F. to 450° F. for one to six or more hours depending on the size of the core. Consequently, the foundry industry has been seeking to improve the manner of utilizing organic binders in handling sand without the application of heat or premixing of a binder and catalyst to obtain set of the mold and core forms. Usually, organic oil type binders are utilized with a catalyst that starts to set up the oil immediately and therefore sand mixtures made therewith must be utilized immediately. In other instances, the mold and core sands are pretreated with an organic material as partially reacted phenol formaldehyde resins, which permit free flow but require the application of heat to set the bond. This creates difficulties and raises problems attending unavoidable contraction and expansion, causing variations in uniformity in mold and core size.

In addition to the problems of heating the sand to set an organic bond, there is a time element involved with known "Air Setting" binders. The sand and binder mixture must be formed in a minimum of time since the mixture has very limited free flow life and a certain additional time is needed to allow a high degree of cure to take place after the sand mixture has been packed into the core box or mold pattern. There exists, then, the problem of regulating optimum production conditions of maximum working life to permit accurate work and minimum curing time to give the highest rate of core or mold production in a given time.

Accordingly, it will be recognized that there is need in the art for providing a method of making core and molding sands with organic binders or binding agents which can be easily handled without advancing and then quickly cured without heat while still in contact with the core box or pattern, to obtain a very accurate reproduction of the pattern or core box and a high tensile strength in a manner of a few seconds of time.

Accordingly, it is an object of this invention to provide an improvement in the method of mixing granular materials and particularly mold and core sands with free flowing stable liquid organic binders therefor which can subsequently be readily cured to a rigid strong state in a matter of a few seconds.

Another object of this invention is to provide an improvement in the method of bonding mold and core sand materials with an organic binder which retains free flow of sand granules for a relative long time limit and sets to a bond having high tensile strength upon room temperature curing by a selective resinifying acid gas in a matter of from a few seconds to a few minutes.

A further object of this invention is to provide an improvement in bonding material for mold and core sands, the binder providing a room temperature cure with high tensile strength, established from a free flowing state to a rigid cured state and the method of applying a selective resinifying acid gas treatment therefor to obtain the rigid cured state in a matter of a few seconds of time.

To the accomplishment of the foregoing and related end this invention or improvement then comprises the features hereinafter fully described and particularly pointed out in the claims, the following description setting forth in detail certain illustrative embodiments of the invention or improvement, these being indicative however, of but a few of the various ways in which the principles of the invention, or improvement, may be employed.

In general, the major feature involved in this improvement in the process of producing mold and core sand forms, and by which the present improvement is evaluated, is its universal approach to both jobber and production shops. Such shops, especially the former type, are desirous of utilizing a single application of an organic bonding agent mixed with the sand to afford ready handling, pouring and packing without an early stiffness or set. After the mix is made and the sand shape formed, a quick set is most desirable. It is by the use of a selective organic bond and selective acid gas treatment therefore that the mold and core sand materials, as hereinafter exemplified, are provided as free flowing bodies and then set to a desired shape in a few moments of time without the need for heat or the necessity of standing for the initial bond to set.

Principally the preferred selective liquid binder material which is mixed with the sand for obtaining an acid gas cured bond is the furfuryl alcohol formaldehyde compound, prepared in the manner as hereinafter described and preferably cured with chlorine gas. However, other gas materials as boron trifluoride, hydrogen chloride, sulfur trioxide and boron trichloride are other less preferable acid gases which may be utilized. The hydrogen chloride gas provides a somewhat faster cure and a higher bond strength.

Other selective liquid binders are compounds containing at least two or more epoxy groups. For example, epoxidized linseed oil, mono- and divinylcyclohexene dioxides, butadiene dioxide, glycidylmethacrylate and its polymers, and the like may be utilized in and as binder compositions for gas setting of granular material. In addition, polymers and copolymers, dimers and trimers of epoxidized esters and oil base materials derived from animal, vegetable and marine sources, including synthetic and petroleum derived aliphatic oils, are suitable in compounding with furfuryl alcohol as prepared liquid binder compositions for bonding granular materials upon curing with certain selective strong acid gases as herein set forth. Included in the above epoxy compounds are "Epon" type compounds of Shell Company and 3,4-epoxy-6-methyl-cyclohexylmethyl-3,4-epoxy-6 - methylcyclohexanecarboxylate (E.P. 201 a product of Union Carbide Chemicals Co.) and the like epoxy material. Further, a styrene material as styrene oxide, divinylbenzene, or dicyclopentadienes and polymers, copolymers thereof, polymers and copolymers forming resins of a furane character, as furfuryl alcohol and polymers or copolymers of the same, or selective mixtures of furfuryl alcohol with epoxy compounds including polyvinylepoxy stearate, polyallyl epoxy soyate, and the like, may be formulated and utilized as gas curable binders for mold and core sands. The above epoxy linseed oil and aliphatic base material as set forth herein and in the claims are well known to the art. Such material and its production is prepared in the manner shown in Niederhauser Patent No. 2,485,160, Swern 2,569,502, British Patent 739,609, and other literature and patents in the prior art.

Essentially it has been discovered that whereas the gas curable polymers and copolymers of the furane type compounds, as furfuryl alcohol-formaldehyde resins are most preferable in bonding granular materials, as herein contemplated, with the chlorine gas, as illustrated, other less preferable type compounds, as divinylbenzene, dicyclopentadiene with a trace of preferably phosphoric acid, polymers of mono- and polyvinylcyclohexenemonoxide, with or without epoxidized linseed oil, and furfuryl alcohol and epoxidized linseed oil material can also be utilized with selective acid gases to bond granular materials as sandpaper and abrasive wheels, mold and core sand. Granular and sand bodies mixed with the furfuryl alcohol type binder compounds are preferably cured with chlorine gas and less preferably with hydrogen chloride gas, sulfur trioxide gas, boron fluoride gas, or trichloride gas. Granular and sand bodies mixed with the dicyclopentadiene type binder materials are cured with boron trifluoride gas, in the presence of preferably a small amount of phosphoric acid or less preferably with an acid having a dissociation constant of about that, or greater than phosphoric acid, for example, sulfuric acid, oxalic acid, hydrochloric acid, paratoluene sulfonic acid, maleic acid and the like. Granular and sand bodies mixed with the divinylbenzene type binder compounds are curable with boron trifluoride gas and borontrichloride gas and granular bodies mixed with the epoxy type binder compounds are preferably cured with borontrifluoride gas.

The sand material, for example, may be any suitable molding shell and core sand as conventional AFS Standard, "Frisk," lake sand and the like, provided they have been dried to less than ½ of 1% moisture content for best results in cure time, tensile strength and minimum gas consumption. The speed of cure is inhibited and tensile strength is weakened by moisture levels greater than ½ of 1% based on the weight of an average sand. In some sand there is a great deal of extraneous material which may be reactive with the selective resin curing acidic gases. This also may require excessive amounts of the selective gas and take additional time to accomplish reaction and set of the resinous binder. There is very little difference in the speed of bonding sand of different grain fineness. The difference is in the direction of slower gassing, or cure, for sands of lower permeability. For best results a minimum of extraneous material is desired. Sand material known as "4 screen sand," dried to a moisture level of at least ½ of 1% and preferably lower, obtains the best results. With the best sand and no extraneous matter the moisture level may be slightly more than the ½ of 1% under suitable conditions.

In the gas setting process for the organic bonding of mold and core sands, conventional mold and core blowers can be used with accurate draw and alignment for exact reproductions. The acid gas setting process, herein described, is preferably utilized in a vacuum-pressure machine with the metal protected by a suitable acid resistant coating, or the forms cast from a suitable acid resistant plastic material, e.g., of the polyvinyl chloride or epoxy type. Preferably the process is equipped with a gas absorber such as a caustic soda scrubber to protect operators against any chance inhalation of the acid treating gas. Such structure is readily recognizable and commercially available for erection by simple mechanical expedience.

Essentially, the process, whereby a quick cold set organic bond of mold and core sand material is obtained, comprises mixing a clean conventional mold and core sand material, having moisture levels not in excess of a mean critical amount of ½ of 1% based on the weight of the sand, with from 1% to about 5% selective binder material and with or without an additive, as hereinafter indicated. This initial step is accomplished by simply mulling the sand and binder mixture sufficiently to obtain good distribution of the binder. The selective gas setting bonds do not immediately preset and are substantially solvent free so that extended mulling times are not harmful to the sand mixtures. Thus, the mixing may be handled in the same manner as an ordinary dry additive. The contact time of the strong acid gas with the binder, needs to be only for about a second or two, to start the curing reaction. For small sand masses the gas penetration is rapid and for larger masses the time may be about 5 to 10 seconds or longer.

To illustrate the organic binder materials and the manner of their application, to produce free flowing granular bodies containing the same and yet provide fast cold-set sand and abrasive granule bonds, the following examples are illustrative:

EXAMPLE I

An organic binder of the preferred type was prepared in a reaction vessel by drawing into the vessel 1000 parts furfuryl alcohol and 540 parts 37%, methanol stabilized, formaldehyde solution. These materials were mixed with an agitator and heated to 150° F., followed by the addition of 2.5 parts phthalic anhydride and heated to reflux temperature of 220° and held at reflux for 2 hours. After this period of reflux, distillate was removed at the rate of 3.2 to 3.3 lbs./min. until 450 parts distillate was obtained, this took about 140 minutes. It was convenient to weigh the distillate every 10 minutes to assure following the distillate rate. The vessel temperature rose to 240°–250° F. during this distillation stage. After obtaining the distillate portion, the reaction product was cooled to 200° F. and 30 parts urea (industrial grade) was added slowly with good agitation.

After adding the urea, the temperature was held at approximately 200° F. for from 1 to about 2 hours, until the free formaldehyde content of the resinous material reached 0.8% maximum. After which water in the amount of 5 parts was distilled off under normal pressure in about 10 to 20 minutes and the product was cooled to 120° F. and filtered. The furfuryl-formaldehyde-urea resinous product was found to be a relatively stable, dark colored liquid material. If desired, the water may be removed by azeotropic distillation with xylene.

After preparing the above, as the preferred type bonding material, a predried molding sand material "4 screen sand" having not more than a mean moisture level of ½ of 1% was mulled with about 2% by weight of the furfuryl formaldehyde product until good distribution was obtained, as noted by an appearance of uniform wetting of the granules. These granules are then ready for packing, as a free flowing binder and sand mix, into a mold or core form. The sand mix may be held for several hours and occasionally, if desired, several days before forming the mold form.

The coated sand was then blown onto a shell mold pattern, to provide a valve casing mold, and the sand shell and pattern transferred to a gassing chamber. As indicated, any conventional "core blower" or "shooter" can be used to blow the sand and organic binder mix, provided the core blower has sufficiently deep drawing capacity and provides for accurate alignment of the pattern or core box, as known to the trade. The coated sand had excellent flowability and since it had no relative green bond was readily packed into all parts of the mold form.

After packing, the pattern shell mold was enclosed in a gas chamber, and the gassing cycle was started by evacuating air from the chamber and filling it with chlorine gas for a period of about 2-4 seconds per inch thickness of the molded form, or until the binder was converted from a normal tan to a dark green to black color. This color change indicated that the bond was set. Thereafter the gas was evacuated from the chamber, the shell mold and pattern withdrawn and the cured sand shell separated from the pattern ready for use in its conventional casting process.

Other similar valve casing mold forms were successfully prepared by treatment of the sand binder in a closed space, with the chlorine gas under pressure for a similar period. Sample tests of the chlorine treated furfuryl alcohol-formaldehyde resin bonded sand mold forms showed an average tensile strength of 55 p.s.i. 5 minutes after gassing, 218 p.s.i. after 1 hour and 325 p.s.i. after 1 day.

Under conditions of high humidity the tensile strength is lower, although still found to be adequate. Thus, for example, the tensile strength of an above sample, in the presence of high humidity (80% to 90%) for 1 day, was 256 p.s.i. This strength is sufficient for all but the most demanding applications.

EXAMPLE II

A more preferred method for the preparation of the preferred organic binder used in bonding sand in a shell pattern or core box is as follows: One thousand parts of furfuryl alcohol and 540 parts of 37%, methanol stabilized, formaldehyde were added to a reaction vessel. The solution was mixed with an agitator and heated to 150° F., followed by the addition of 2.5 parts of phthalic anhydride and heated to reflux temperature of 220° F. and held at reflux for 3.5 to 4.0 hours. After this period of reflux, 2.4 parts of 33% sodium hydroxide were added which raised the pH of the resin to about 5.5. The reaction vessel was adjusted for distillation until the temperature of the resin in the vessel reached 250° F. to 260° F. About 1.5 hours were required and about 400 parts of distillate were removed. The vessel was cooled to 200° and 30 parts of urea (industrial grade) was added slowly with good agitation.

After adding the urea, the temperature was held at approximately 200° F. for from 1 to about 2 hours, until the free formaldehyde content of the resinous material reached 0.8% maximum. This resinous product was a relatively stable, dark colored liquid material, which was used in the manner described in Example I. Performance was comparable, on converting from a free flowing sand body to a rigid sand form, in every respect to the mold and core forms of Example I, as herein described. The furfuryl alcohol-formaldehyde-phthalic anhydride of Example II, when treated with the preferred sodium hydroxide material, as described, increased the shelf life of the binder material. However, other alkali material as potassium hydroxide may be substituted in equivalent amount with a slight increase, in each instance, of the acid gassing time to obtain the initial conversion of the granule and binder mixture from its free flowing state to a relatively solid non-flowing rigid state.

The following table is illustrative of a number of different acid gas treatments of different organic bonds and molding sand mixes. In each instance, the binder was added in an amount of about 2% by weight of core sand and thoroughly mixed therewith. Tensile briquette mold forms were packed with the core sand and resinous forming binders prepared as described above. After packing the core form it was treated with reactant gas in a closed space for an average period of from 1 to 2 seconds. Generally, the time element for each example was on the order of 20 to 30 seconds from the time of placing the mold form in an enclosure, gassing and withdrawing the gassed form.

Table 1
TENSILE STRENGTHS OF GASSED BRIQUETTES

| Binder (2% by weight based on sand) | Gas | Tensile strengths (p.s.i.) at the indicated time after gassing | | |
|---|---|---|---|---|
| | | 5 minutes | 1 hour | 1 day |
| Example III: Furfuryl alcohol-formaldehyde resin (as in Example I) | BCl₃ | 55 | 218 | 325 |
| | BF₃ | 55 | 118 | 225 |
| | HCl | 70 | 70 | 70 |
| | Cl₂ | 90 | 223 | 360 |
| Example IV: Epoxidized linseed oil (8.3% oxirane) | BF₃ | soft | 20 | 167 (3 days) |
| Example V: Furfuryl alcohol-formaldehyde resin plus epoxidized linseed oil (equal wts.) | BF₃ | 30 | 65 | 157 (3 days) |
| Example VI: Furfuryl alcohol (monomeric) | BCl₃ | 30–65 | 70–140 | 185–270 |
| | BF₃ | 110 | 105 | 83 |
| | Cl₂ | 30 | Not measured | 75 |
| Example VII: Solution of equal wts. of furfuryl alcohol and epoxidized linseed oil | BF₃ | 115 | 207 | 360 (3 days) |
| Example VIII: Divinylbenzene | BCl₃ | 98 | 108 | 115 |
| | BF₃ | 82 | 97 | 147 |
| Example IX: Solution of equal wts. of furfuryl alcohol and divinylbenzene | BF₃ | 110 | 165 | 165 |
| Example X: Dicyclopentadiene and 1% 85% phosphoric acid | BF₃ | 35 | 82 | 62 |

Example X is illustrative of a room and low temperature polymerization catalyst for film forming dicyclopentadiene materials with a synergistic combination of phosphoric acid and boron trifluoride. This catalyst combination may be employed in other ways, e.g., as in a complex form of the phosphoric acid and BF₃ etherate, or alcoholate, and the like.

As indicated above the epoxidized linseed oil (8.3% oxirane value) was relatively soft after 5 minutes' gassing. However, the binder was sufficiently set to maintain the mold shape and positively set after standing, as were the other binders. Initially the other bonds were relatively hard and brittle after only a few seconds of gassing and almost all the bonded forms became increasingly more hard and brittle after standing, as indicated. The initially hardened bonds were found to have sufficient tensile strength to eliminate the problem of warping or sagging during the one hour standing period. Where no great tensile strain is placed on the shell or core, they may be used immediately. However, the ultimate bond strength of a number of the binders is not reached until some time after the gassing step has been completed. Thus, in some instances, when the shell or core is to be subjected to stress or strain, they must be stored for not less than about 1 hour to complete the curing reaction of the binder. The tensile strength of the gassed binders, as indicated, gradually increases during this storage period even though they do have a sand surface with high scratch hardness and the molded form is firm and rigid.

In some instances it may be desirable to heat the pre-set mold form to increase the tensile strength. For example, the bond obtained, after gassing the binder in Example I had an initial cured tensile strength of about 90 p.s.i. and on standing for about one hour a tensile strength of about 200 p.s.i., but on heating for 10 to 15 minutes at 425 F. the tensile strength reaches about 350 p.s.i. Something over a day's time of standing at normal temperature, after the cure treatment, would be required to obtain this added tensile strength. In addition, the composition of Example I may contain other materials to aid in controlling the green sand properties and high temperature properties of the sand core or mold as may be desired in specific cases.

The following table illustrates the effect of adding silica flour, fine clay and iron oxide to the binder composition of Example I.

Table II
EFFECT OF VARIOUS ADDITIVES ON HOT STRENGTH AND GREEN BOND OF EXAMPLE I SAND MIXTURES

| Binder Content Percent (wt. sand) | Additive Type | Additive Percent (wt. sand) | Green Comp. Strength, p.s.i. | Hot Strength, p.s.i. 1,000° F. | 1,500° F. | 2,000° F. | 2,500° F. |
|---|---|---|---|---|---|---|---|
| 2.0 | No additive | 0 | 0.31 | 188 | 58 | 28 | 13 |
| 2.5 | Fire Clay | 2.0 | 0.50 | 220 | 76 | 41 | 20 |
| 2.0 | Silica Flour | 2.0 | 0.58 | 194 | ---- | 27 | 16 |
| 3.0 | Silica Flour | 6.0 | 0.75 | 208 | ---- | 28 | 18 |
| 2.5 | Fire Clay / Silica Flour / Iron Oxide | 1.0 / 1.0 / 1.0 | 0.80 | 400 | 122 | 290 | 200 |
| 2.5 | Western bentonite | 0.5 | 0.87 | (¹) | (¹) | (¹) | (¹) |

¹ Not measured.

The above additives affect the green sand properties by affording initial bond but do not affect free flow. Also, the hot strength of the formed mold and core is increased. This increase is desirable, dependent upon the size of the metal piece to be formed. The larger sizes requiring more hot strength for bond retention when the bonded sand is contacted by the liquid metal. At high temperatures the organic bonds carbonize.

With respect to the dicyclopentadiene, styrene and epoxy compounds, when utilized alone or when properly compounded with furfuryl alcohol and divinyl benzene, and mixed with sand then treated with an acid gas, there is formed an initial set with sufficient hardness for molding under conditions which do not require high heat. These binders are less preferable in that under heated conditions they tend to be more or less thermoplastic or have a delayed set dependent upon the particular compound.

The binders, as described, including the divinylbenzene and furfuryl alcohol mixture, or epoxidized linseed oil and furfuryl alcohol mixture, the divinylbenzene and dicyclopentadiene with 1% strong phosphoric acid (85%) all obtain a cure set with the herein described gas treatment at essentially normal foundry room temperatures. Thus, it will be recognized that the binder compositions, as indicated, and the gas setting conditions are matters within individual control of selectivity and as may be necessarily required for any relative operating condition. The bonds established in any ordinary case can be set up with no appreciable initial reaction before gassing and can be burned out by the heat of molten metal to provide the necessary mold or core collapsibility, after the metal casting has solidified.

An alternative and different application of the type bond set forth in Example I is illustrated by the bonding of abrasive granules to a paper backing, as follows:

EXAMPLE XI

The furfuryl alcohol formaldehyde product of Example I was spread over a heavy fibrous paper backing. Abrasive material, as sand, was sprinkled over the coated surface and the coated paper material was placed in the gas treating chamber. Chlorine gas passed into the chamber for a few seconds (about 3 to 5). The chamber was exhausted of the gas and the coated paper removed. The sand was found to be firmly bonded to the paper backing into which the liquid binder had penetrated surprisingly reinforcing the backing and making it water resistant without any further treatment. The bond was flexible and has remained flexible to over 60° bends for several weeks and did not appear to be brittle or appreciably decreasing in flexibility.

EXAMPLE XII

An abrasive block, simulating an abrasive wheel, was formed using silicon carbide as the abrasive mixed with about 2.5% by weight of the composition of Example I and gassed for about 3 to 5 seconds. The abrasive block appeared to have the hardness characteristic of an abrasive or sandstone wheel. The tensile strength was in the range as indicated for the sand mold and increased correspondingly on standing, and heating as indicated. Due to the necessity of abrasive wheels withstanding high internal stress and strains, the gas cured organic bond is preferably additionally heat treated at a moderate temperature of about 300° to 350° F. for a period of 20 to 30 minutes, or otherwise stored, until a further and more complete set is obtained. The preferred binder of Example II and other binders, as described, likewise provided quick cold set bonds for abrasive sheet, abrasive block and wheel materials.

It will be apparent that modifications and variations of this invention as hereinabove set forth may be made without departing from the spirit and scope thereof. The specific embodiment described therefor are given by way of example only and invention is limited only by the terms of the appended claims.

We claim:

1. The method of cold-set converting, under normal room temperature conditions, a free flowing sand body to a rigid sand form of mold and core sand material comprising the steps of mixing from about 95% to 99% sand having a moisture level no greater than about ½ of 1% based on the weight of the sand with from about 1% to 5% liquid furfuryl alcohol-formaldehyde resinous material to form a non-aqueous free-flowing sand and binder composition, packing the said free flowing mixed sand and binder composition into a molded form, passing a catalytic strong acid gas into and about the packed molded form for a few seconds at normal room temperature, and effecting at said normal room temperature a tensile strength of at least about 55 pounds per square inch in a period of about 5 minutes after said gassing treatment.

2. The method of claim 1 wherein the acid gas material is a gas selected from the group consisting of sulfur trioxide, sulfur chloride, borontrifluoride, borontrichloride, hydrogen chloride, and chlorine.

3. In the method of cold-set converting a free flowing sand body to a rigid sand form in sand molds and cores under normal room temperature conditions, the steps comprising mixing essentially sand material having a moisture level no greater than about ½ of 1% based on the weight of the sand with from about 1% to 5% relatively moisture free liquid resin bonding material as a non-aqueous free flowing mixture; said liquid resin bonding material being a polymerizable furfuryl alcohol polymer, forming the sand mold form with the free flowing liquid resin-sand mixture, and gassing the formed mold with a catalytic acid gas for from about 1 second to about 10 seconds to set the sand mass to an initial tensile strength of at least about 30 p.s.i. within about 5 minutes after gassing and about twice this value within about 1 hour after gassing under the said normal temperature conditions.

4. In the method of cold-set converting a free flowing sand body to a rigid sand form in sand molds and cores under normal room temperature conditions, the steps comprising mixing essentially sand material having a moisture level no greater than about ½ of 1% based on the weight of the sand with from about 1% to 5% relatively moisture free liquid resin bonding material as a non-aqueous free flowing mixture; said liquid resin bonding material being a polymerizable furfuryl alcohol polymer and an epoxy compound, forming the sand mold form with the free flowing liquid resin-sand mixture, and gassing the formed mold with boron trifluoride gas for from about 1 second to about 10 seconds to set the sand mass to an initial tensile strength of at least about 30 p.s.i. within about 5 minutes after gassing and about twice this value within about 1 hour after gassing under the said normal temperature conditions.

5. The method of claim 3 wherein the liquid resin bonding material contains divinylbenzene.

References Cited in the file of this patent

UNITED STATES PATENTS

| | | |
|---|---|---|
| 2,201,321 | Robie | May 21, 1940 |
| 2,423,139 | Delmonte | July 1, 1947 |
| 2,471,600 | Adams | May 31, 1949 |
| 2,760,944 | Greenlee | Aug. 28, 1956 |
| 2,824,345 | Zifferer | Feb. 25, 1958 |
| 2,846,742 | Wagner | Aug. 12, 1958 |
| 2,854,715 | Kura | Oct. 7, 1958 |
| 2,878,539 | Halpern et al. | Mar. 24, 1959 |
| 3,008,205 | Blaies | Nov. 14, 1961 |

FOREIGN PATENTS

| | | |
|---|---|---|
| 531,968 | Canada | Oct. 16, 1956 |

OTHER REFERENCES

Berkman, Mowell and Egloff: "Catalysis," page 626, copyright 1940.